(12) United States Patent
Brennand et al.

(10) Patent No.: US 8,382,441 B2
(45) Date of Patent: Feb. 26, 2013

(54) METHOD OF MANUFACTURING A BLADE

(75) Inventors: Phillip Brennand, Barnoldswick (GB); Richard M Jones, Colne (GB)

(73) Assignee: Rolls-Royce PLC, London (GB)

( * ) Notice: Subject to any disclaimer, the term of this patent is extended or adjusted under 35 U.S.C. 154(b) by 506 days.

(21) Appl. No.: 12/699,507

(22) Filed: Feb. 3, 2010

(65) Prior Publication Data

US 2010/0221117 A1    Sep. 2, 2010

(30) Foreign Application Priority Data

Feb. 27, 2009    (GB) .................................. 0903280.6

(51) Int. Cl.
*B64C 11/20* (2006.01)
*B64C 11/24* (2006.01)

(52) U.S. Cl. ................. 416/229 R; 416/229 A; 228/157

(58) Field of Classification Search ............. 416/229 R, 416/229 A, 232, 233; 228/193, 157; 29/889.1, 29/889.2, 889.21, 889.721

See application file for complete search history.

(56) References Cited

U.S. PATENT DOCUMENTS

| | | | | |
|---|---|---|---|---|
| 4,882,823 A | * | 11/1989 | Weisert et al. | 29/6.1 |
| 5,253,419 A | | 10/1993 | Collot et al. | |
| 5,439,354 A | * | 8/1995 | Hansen et al. | 416/233 |
| 5,479,705 A | | 1/1996 | Fowler et al. | |
| 5,513,791 A | * | 5/1996 | Rowe et al. | 228/118 |
| 5,611,944 A | * | 3/1997 | Gilkinson et al. | 219/117.1 |
| 5,692,881 A | | 12/1997 | Leibfried | |
| 6,279,228 B1 | | 8/2001 | Kobayashi et al. | |

FOREIGN PATENT DOCUMENTS

| | | |
|---|---|---|
| EP | 0 432 308 A1 | 6/1991 |
| EP | 0 765 711 A1 | 4/1997 |
| GB | 2 289 429 A | 11/1995 |
| GB | 2 306 353 A | 5/1997 |

OTHER PUBLICATIONS

European Search Report issued in European Patent Application No. EP 10 25 0184 dated Jun. 11, 2010.
British Search Report issued in European Patent Application No. 0903260.6, on Mar. 30, 2009.

* cited by examiner

*Primary Examiner* — Ninh H Nguyen
*Assistant Examiner* — William Grigos
(74) *Attorney, Agent, or Firm* — Oliff & Berridge, PLC

(57) ABSTRACT

A method of manufacturing a blade (20) for a turbomachine by superplastic forming and diffusion bonding a first layer (18), a second layer (16) and a membrane (2), the membrane (2) being disposed between the first and second layers (18, 16), the method comprising: applying a stop-off material in a first predetermined pattern between the first layer (18) and the membrane (2) so as to prevent a diffusion bond from forming between the first layer and the membrane across said first predetermined pattern; and applying the stop-off material in a second predetermined pattern between the second layer (16) and the membrane (2) so as to prevent a diffusion bond from forming between the second layer and the membrane across said second predetermined pattern.

15 Claims, 3 Drawing Sheets

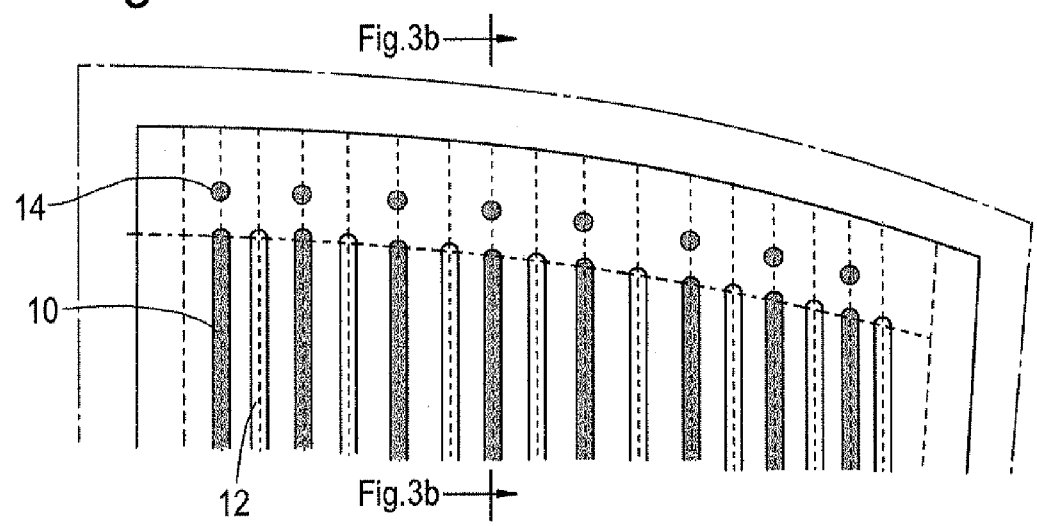
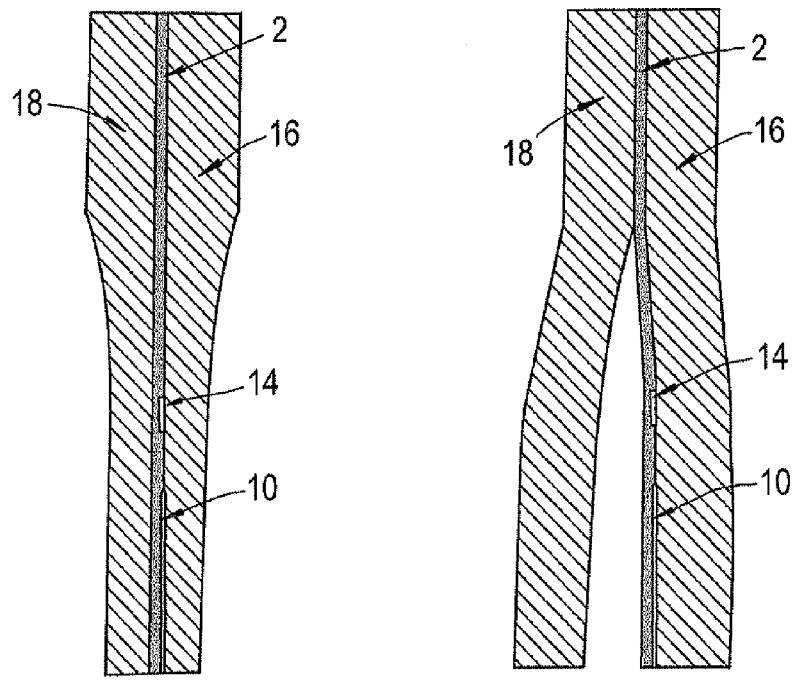

METHOD OF MANUFACTURING A BLADE

The present invention relates to a method of manufacturing a blade for a turbomachine by superplastic forming and diffusion bonding.

It is known to manufacture hollow metallic turbomachine blades, in particular fan blades for a jet engine, by superplastic forming and diffusion bonding metal workpieces, the workpieces forming pressure and suction surfaces of the blade. These metal workpieces may include elemental metal, metal alloys and metal matrix composites. At least one of the metal workpieces may be capable of superplastic extensions. In one known process the surfaces of the workpieces to be joined are cleaned, and at least one surface of one or more of the workpieces is coated in preselected areas with a stop-off material to prevent diffusion bonding. The workpieces are arranged in a stack and the edges of the workpieces are welded together, except where a pipe is welded to the workpieces, to form an assembly. The pipe enables a vacuum, or inert gas pressure, to be applied to the interior of the assembly. The assembly is placed in an autoclave and heated so as to "bake out" the binder from the material to prevent diffusion bonding. The assembly may then be evacuated, using the pipe, and the pipe is sealed. The sealed assembly is placed in a pressure vessel and is heated and pressed to diffusion bond the workpieces together to form an integral structure. Diffusion bonding occurs when two matte surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

In addition to the hollow structure just described, it is also known to insert a membrane 2 between the metal workpieces 4, 6 prior to the above described process (see FIG. 1 for example). The location of diffusion bonds between the membrane and the adjacent workpieces can be controlled by applying the stop-off material to preselected areas on each side of the membrane (or respective workpieces). When the blade is subsequently expanded, the membrane adheres to the workpieces where the diffusion bond is allowed to form and thereby provides an internal structure (see for example the Warren girder type construction shown in FIG. 2).

Various internal structures have been proposed and different preselected patterns of the stop-off material are required to achieve these structures. For example, an egg box type internal structure can be provided by applying the stop-off material to both sides except for a series of non-overlapping dots on either side. Blades produced with such an internal structure are very rigid, but a downside of this rigidity is that they are prone to failure following a bird strike.

To resolve this problem, U.S. Pat. No. 5,479,705 discloses an internal structure with a Warren girder type cross-section, which is formed by a pattern of alternating strips 10, 12 on either side of the membrane where there is no stop-off material (see FIGS. 1 and 2 for example). Such blades are better at withstanding a bird strike due to the presence of a crumple zone which allows them to yield rather than fracture. However, during the expansion of the blade the membrane may stick to the pressure surface workpiece in the region between the blade tip and the edge of the aforementioned strips, because the stop-off material sticks to the pressure surface and sufficient gas may not be able to flow either side of the membrane in this region. This sticking may inhibit the expansion during the superplastic process and this can be particularly problematic for the pressure surface which should move the most during the expansion process (see for example the pressure surface 18 shown in FIG. 3b (ii)). Furthermore, the shape of the pressure surface of a fan blade is aerodynamically very important.

To prevent the membrane from sticking to the pressure surface, a pattern comprising the previously mentioned strips 10, 12, but with additional dots 14 on the suction side 16 has been proposed (see FIG. 3a). The strips 10 are on the suction side 16 and the strips 12 are on the pressure side 18. With such a bond pattern, the dots 14 are in the tip area of the blade and are in line with the strips 10 printed on the suction side 16 of the membrane.

The dots 14 define further regions in which there is no stop-off material and in which a diffusion bond is allowed to form. The dots therefore ensure that the membrane adheres to the suction surface at the tip region and keep the membrane away from the pressure surface so as not to inhibit the expansion of the pressure surface (see FIGS. 3a and 3b).

However, a problem with the strip and dot pattern is that insufficient gas can flow around either side of the membrane, in particular between the suction surface and the membrane. In other words, the dots, being printed on the suction panel, cause the membrane to be held against that panel, hence trapping the gas over the tip region. When this occurs, uneven gas pressure causes distortion of the membrane producing unacceptable components.

According to a first aspect of the present invention there is provided a method of manufacturing a blade for a turbomachine by superplastic forming and diffusion bonding a first layer, a second layer and a membrane, the membrane being disposed between the first and second layers, the method comprising: applying a stop-off material in a first predetermined pattern between the first layer and the membrane so as to prevent a diffusion bond from forming between the first layer and the membrane across said first predetermined pattern; wherein the first pattern is applied such that it defines one or more first strips and one or more first dots, the first strips and first dots being void of the stop-off material, and wherein the first strips are arranged in a span-wise direction, and the first dots are located between the first strips and the blade tip edge, the first dots being offset from a longitudinal axis of the first strips in a chord-wise direction; and applying the stop-off material in a second predetermined pattern between the second layer and the membrane so as to prevent a diffusion bond from forming between the second layer and the membrane across said second predetermined pattern; wherein the second pattern is applied such that it defines one or more second strips and one or more second dots, the second strips and second dots being void of the stop-off material, and wherein the second strips are arranged in a span-wise direction and the second dots are located between the second strips and the blade tip edge, the second dots being offset from a longitudinal axis of the second strips in a chord-wise direction; wherein the first and second predetermined patterns are applied such that the second strips are spaced apart from the first strips and the first dots are spaced apart from the second dots on opposite sides of the membrane.

The first predetermined pattern may define one or more first discrete zones of stop-off material, the stop-off material preventing a diffusion bond from forming between the first layer and the membrane in the said first discrete zones. Similarly, the second predetermined pattern may define one or more second discrete zones of stop-off material, the stop-off material preventing a diffusion bond from forming between the second layer and the membrane in the said second discrete zones.

The method may comprise applying the first and second predetermined patterns such that the second dots are in line with the longitudinal axes of the first strips. The method may comprise applying the first and second predetermined patterns such that the first dots are in line with the longitudinal axes of the second strips.

The method may comprise applying the first and second predetermined patterns such that the spacing between the first strip and the neighbouring second dot is a function of the spacing between the first strip and the neighbouring second strip. The spacing between the first strip and the neighbouring second dot may be equal to the spacing between the first strip and the neighbouring second strip multiplied by a strain ratio of the blade.

The size of the first or second dots may be a function of one or more of: (a) the spacing between neighbouring strips adjacent to the first or second dot; (b) the width of the strip adjacent to the first or second dot; (c) the spacing between the longitudinal axes of the strips adjacent to the first or second dot; and (d) a strain ratio of the blade. The size of the first or second dot may decrease with the distance of the first or second dot from the blade tip.

The first and second strips may be substantially obround or they may be any other desired shape, for example substantially rectangular. The first and second dots may be substantially circular or they may be any other desired shape.

The first and second predetermined patterns may be arranged so as to allow a diffusion bond to be formed along the blade edges.

The first layer may form a pressure surface or a suction surface of the turbomachine blade and the second layer may form the other of the pressure surface or suction surface. The blade may be a compressor fan blade.

The method may further comprise heating and pressing the first and second layers and the membrane to diffusion bond the first and second layers and the membrane together to form an integral structure. The method may further comprise placing the first and second layers and the membrane between appropriately shaped dies; heating the first and second layers, the membrane and dies; and supplying a pressurised fluid between the first and second layers to cause at least one of the first and second layers to be superplastically formed.

According to a second aspect of the present invention there is provide a blade for a turbomachine comprising a first layer, a second layer and a membrane therebetween, wherein the membrane is joined to the first layer across one or more first strips and one or more first dots, the first strips being arranged in a span-wise direction, and the first dots being located between the first strips and the blade tip edge, the first dots being offset from a longitudinal axis of the first strips in a chord-wise direction; and the membrane is joined to the second layer across one or more second strips and one or more second dots, the second strips being arranged in a span-wise direction and the second dots being located between the second strips and the blade tip edge, the second dots being offset from a longitudinal axis of the second strips in a chord-wise direction; wherein the second strips are spaced apart from the first strips and the first dots are spaced apart from the second dots on opposite sides of the membrane.

For a better understanding of the present invention, and to show more clearly how it may be carried into effect, reference will now be made, by way of example, to the accompanying drawings, in which:—

FIG. 3a shows a view of a fan blade in the region of the tip with a previously-proposed stop-off material pattern;

FIG. 3b shows a sectional view of the fan blade tip shown in FIG. 3a (i) before superplastic expansion; and (ii) after superplastic expansion.

Figure 1:
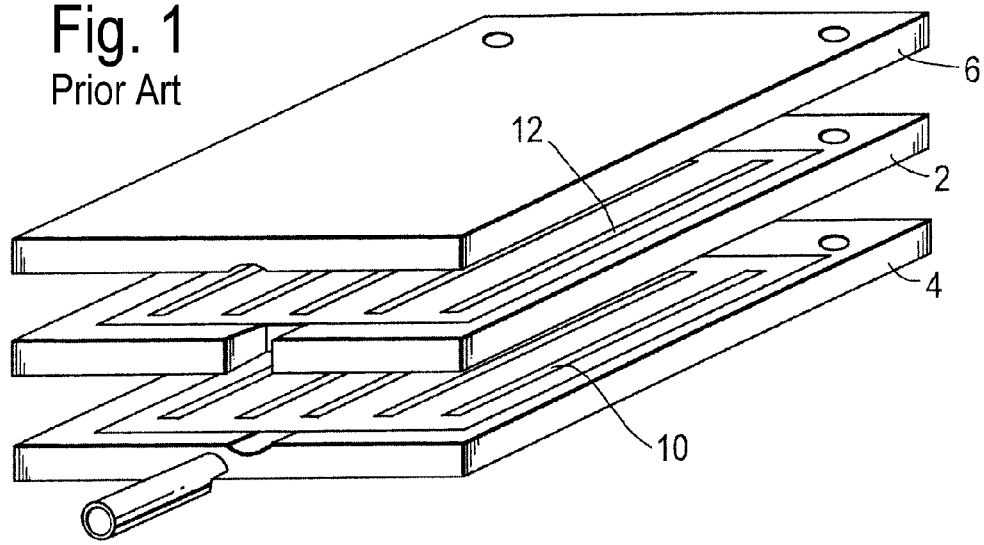
FIG. 1 illustrates an exploded view of a prior art arrangement of workpieces which are superplastically formed and diffusion bonded to form a fan blade.
Figure 2:
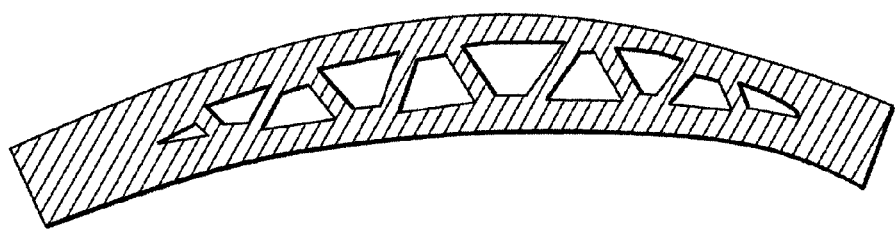
FIG. 2 shows a cross-section through the internal structure of a fan blade after diffusion bonding and superplastic expansion.
Figure 4:
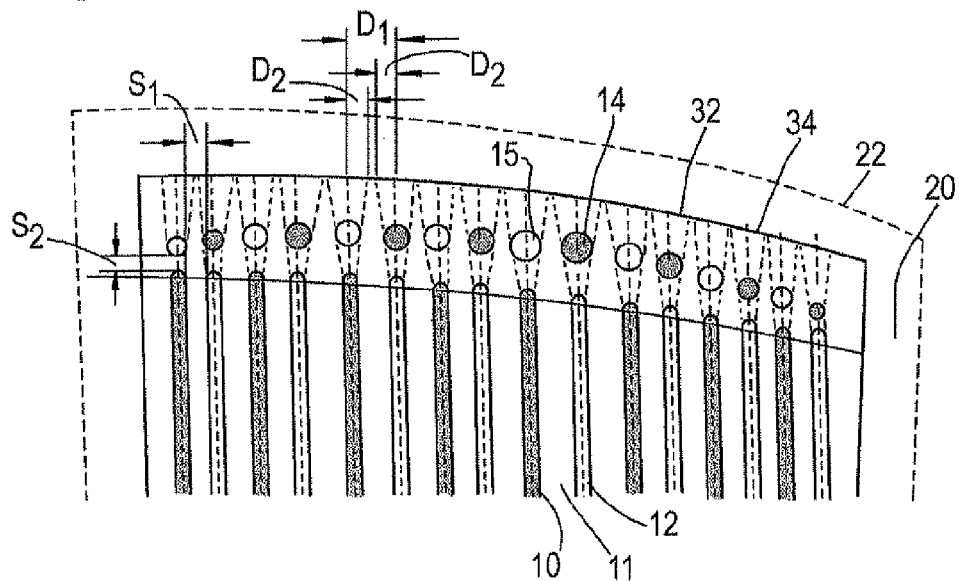
FIG. 4 shows a view of a fan blade in the region of the tip with a stop-off material pattern according to the present invention.

With reference to FIG. 4, a blade 20 for a turbomachine according to the present invention comprises three layers: a suction surface layer 16, a pressure surface layer 18 and a membrane 2, which is disposed between the suction and pressure surface layers 16, 18. Prior to bonding the suction surface and pressure surface layers 16, 18 to the membrane 2, a stop-off material is applied to both the suction surface and pressure surface layers on the sides closest to the membrane 2. The stop-off material may alternatively be applied to the respective sides of the membrane 2. Once the stop-off material has been applied, the layers are stacked together and heat and pressure are applied such that a diffusion bond is formed between the respective layers, except that a diffusion bond is not formed where the stop-off material has been applied. The blade 20 is then located between appropriately shaped dies and is placed within an autoclave. The blade 20 and dies are heated and pressurised fluid is supplied into the interior of the blade to cause at least one of the layers to be superplastically formed to produce a blade matching the shape of the dies. The blade 20 may also be twisted into shape.

FIG. 4 shows where the stop-off material is to be applied in the region of the blade tip, according to the present invention (the blade hub is not shown). On the suction side of the membrane 2, the stop-off material is applied within a region defined by inner suction side edge 32. Accordingly, there is no stop-off material between an outer edge 22 of the blade 20 and the inner suction side edge 32, thereby ensuring that a diffusion bond is able to form between the membrane 2 and the suction surface layer 16 around the edge of the blade 20. On the suction side of the membrane 2, the stop-off material is also not applied in regions defined by one or more strips 10 and one or more dots 14. The strips 10 are arranged in a substantially radial direction (i.e. in a span-wise direction from the hub to the blade tip) and the strips 10 stop short of the inner suction side edge 32. The dots 14 are disposed between the tip-most ends of strips 10 and the inner suction side edge 32 and the dots 14 are arranged so that they are offset in a chord-wise direction from a longitudinal axis of the strips 10. The dots 14 are not necessarily circular in shape and may be any desired shape. The strips 10 are obround (i.e. a shape consisting of two semicircles connected by parallel lines tangent to their endpoints), but alternatively may be any other desired shape, for example a rectangle.

On the pressure side of the membrane 2, the stop-off material is applied within a region defined by inner pressure side edge 34. Accordingly, there is no stop-off material between the outer edge 22 of the blade 20 and the inner pressure side edge 34, thereby ensuring that a diffusion bond is able to form between the membrane 2 and the pressure surface layer 18 around the edge of the blade 20.

The inner pressure side edge 34 is substantially the same as the inner suction side edge 32, in that on the pressure side of the membrane 2, the stop-off material is applied within a region defined by inner pressure side edge 34. Accordingly, there is no stop-off material between the outer edge 22 of the blade 20 and the inner pressure side edge 34, thereby ensuring that a diffusion bond is able to form between the membrane 2 and the suction surface layer 16 around the edge of the blade 20. The inner pressure side edge 34 overlaps the inner suction side edge 32 at the blade tip, but the inner pressure side edge 34 may be offset from the inner suction side edge 32 at the leading and trailing edges of the blade.

On the pressure side of the membrane 2, the stop-off material is also not applied in regions defined by one or more strips 12 and one or more dots 15. The strips 12 are arranged in a substantially radial direction (i.e. in a span-wise direction from the hub to the blade tip) and the strips 12 stop short of the inner suction side edge 32 at substantially the same distance from the suction side edge 32 as the strips 10 on the suction side. The dots 15 are disposed between the tip-most ends of strips 12 and the inner pressure side edge 34 and the dots 15 are arranged so that they are offset in a chord-wise direction from a longitudinal axis of the strips 12. The dots 15 are not necessarily circular in shape and may be any desired shape. The strips 12 are obround, but alternatively may be any other desired shape, for example a rectangle.

The strips 12 on the pressure side are arranged such that they are interspersed between the strips 10 on the suction side, i.e. the strips 10, 12 are arranged such that there are gaps 11 between adjacent strips 10, 12. With this arrangement, when the blade 20 is expanded, the membrane 2 adheres to the suction surface layer 16 at the strips 10 and the membrane 2 adheres to the pressure surface layer 18 at strips 12. The membrane therefore forms a warren girder type internal structure with the membrane between adjacent strips 10, 12 (i.e. the portion of the membrane overlapping the gaps 11) forming struts and ties between the suction and pressure surface layers 16, 18.

As for the strips, the dots 15 on the pressure side are arranged such that they are interspersed between the dots 14 on the suction side, with gaps between adjacent dots 14, 15. The dots 15 on the pressure side are preferably, although not necessarily, in line with the longitudinal axes of strips 10 on the suction side. Similarly, the dots 14 on the suction side are preferably, although not necessarily, in line with the longitudinal axes of strips on the pressure side. This pattern creates a checkerboard type effect with the dots 14, 15 and strips 10, 12 arranged on either side of the membrane.

As shown in FIG. 4, the first and second dots may be placed a distance $S_2$ in a radial direction from the end of the adjacent first or second strip with which the first or second dot is in line with. The distance $S_2$ between dots 14, 15 and adjacent strips 10, 12 may be a function of $S_1$ the distance between the neighbouring strip 10, 12 and the strip in question (i.e. the width of the local gap 11). In particular, the distance $S_2$ may be governed by the relationship, $$S_2 = pS_1$$

where p is a strain ratio which is a measure of the strain undergone by the blade during the superplastic expansion process, i.e. the increase in a particular dimension expressed as a ratio of the original dimension. The strain ratio may be a local strain ratio or an overall strain ratio of the blade.

The size of the first and second dots may also be determined by the strain ratio, p. As shown in FIG. 4, the dot may be generated by fitting a circle or any other shape between three lines. The first line is perpendicular to the longitudinal axis of the first or second strip with which the first or second dot is in line with and is a distance $S_2$ in a radial direction from said strip. The second and third lines emanate from respective points on the adjacent strip where the semicircle meets the parallel lines of the obround at the tip-most end of the obround. The second and third lines meet the inner pressure or suction side edges 34, 32 at a distance $D_2$ either side of the longitudinal axis of the strip adjacent to the dot in question. The distance $D_2$ may be governed by the relationship, $$D_2 = p\frac{D_1}{2}$$

where p is the same strain ratio as mentioned above and $D_1$ is the distance between the longitudinal axes of the neighbouring strip 10, 12 and the strip in question. The dot therefore fits in the space defined by these three lines so that the lines are tangential to the circumference or perimeter of the dot. Thus, with the arrangement described above, the closer the dot is to the blade tip, the larger the dot is likely to be. This helps to ensure that the diffusion bond formed at the dot is sufficient to hold the membrane to the respective pressure or suction surface.

Figure 5A:
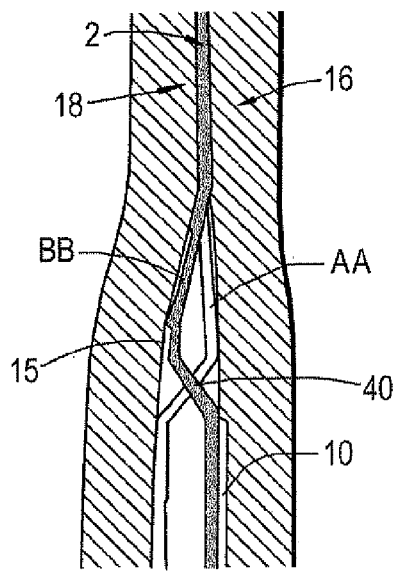
FIG. 5(a) shows a sectional view of the fan blade tip after superplastic expansion for the two cross-sections shown in FIG. 5(b).
Figure 5B:
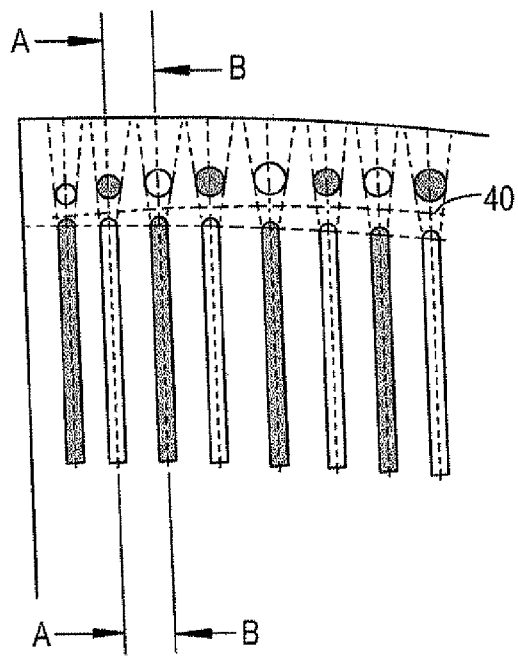

With reference to FIG. 5(a), two cross-sections of the blade 20 are shown. As is shown in FIG. 5(b) the first, which is denoted AA, corresponds to a cross-section taken through the longitudinal axis of strip 12 on the pressure side of the membrane, and the second, which is denoted BB, corresponds to a cross-section taken through the longitudinal axis of strip 10 on the suction side of the membrane.

FIG. 5(a) shows that dots 15 hold the membrane 2 off the suction surface layer 16, thereby allowing gas to flow more easily between the membrane 2 and the suction surface layer 16 such that the suction surface layer may expand to the desired shape. Furthermore, the dots 14 hold the membrane 2 off the pressure surface layer 18, thereby allowing gas to flow more easily between the membrane 2 and the pressure surface layer 18 such that the pressure surface layer may expand to the desired shape.

The alternating nature of the strip and dot arrangement effectively provides a series of saddle points either side of which a series of vaulted chambers are provided. The vaulted chambers on the suction side of the membrane therefore provide a continuous flow path between the strips 10 and dots 14 on the suction side and this enables gas to get around the dots 14 on the suction side. Similarly, the vaulted chambers on the pressure side of the membrane provide a continuous flow path between the strips 12 and dots 15 on the pressure side and this enables gas to get around the dots 15 on the pressure side. The gas flow path between the membrane 2 and the suction and pressure surface layers 16, 18 ensures that gas is easily able to reach either side of a particular dot. In other words, the strip and dot patterns according to the present invention serves to provide a gas flow path between the membrane and the pressure surface and suction surface layers in the region of the blade tip, thereby enabling sufficient gas flow either side of the membrane.

The saddle points define a locus 40 between the dots 14, 15 and tip-most ends of the strips 10, 12. The locus 40 is a line along the membrane in a chord-wise direction, which is between the suction and pressure surfaces layers 16, 18, such that the locus does not touch either of the suction or pressure surface layers 16, 18. Furthermore, due to the dots 14, 15 and strips 10, 12 alternating between the suction and pressure sides, the membrane forms wave type lines either side of the locus 40 in a chord-wise direction.

In effect the alternating dot arrangement creates a second Warren girder type internal structure which is offset from a first Warren girder type internal structure formed by the strips 10, 12. These offset Warren girder structures ensure that gas can flow around both sides of the membrane 2 in the region of the blade tip.

The aforementioned arrangement with the dots on the suction side prevents the membrane from sticking just to the pressure surface, thereby ensuring that the expansion of the pressure surface is not inhibited. Similarly, the presence of the dots on the pressure side ensure that sufficient gas can flow between the suction surface and the membrane, thereby ensuring an even gas pressure and minimal distortion of the suction surface.

The invention claimed is:

1. A method of manufacturing a blade for a turbomachine by superplastic forming and diffusion bonding a first layer, a second layer and a membrane, the membrane being disposed between the first and second layers, the method comprising:
    applying a stop-off material in a first predetermined pattern between the first layer and the membrane so as to prevent a diffusion bond from forming between the first layer and the membrane across said first predetermined pattern; wherein the first pattern is applied such that it defines one or more first strips and one or more first dots, the first strips and first dots being void of the stop-off material, and wherein the first strips are arranged in a span-wise direction, and the first dots are located between the first strips and the blade tip edge, the first dots being offset from a longitudinal axis of the first strips in a chord-wise direction; and
    applying the stop-off material in a second predetermined pattern between the second layer and the membrane so as to prevent a diffusion bond from forming between the second layer and the membrane across said second predetermined pattern; wherein the second pattern is applied such that it defines one or more second strips and one or more second dots, the second strips and second dots being void of the stop-off material, and wherein the second strips are arranged in a span-wise direction and the second dots are located between the second strips and the blade tip edge, the second dots being offset from a longitudinal axis of the second strips in a chord-wise direction;
    wherein the first and second predetermined patterns are applied such that the second strips are spaced apart from the first strips and the first dots are spaced apart from the second dots on opposite sides of the membrane.

2. The method of manufacture according to claim 1, wherein the method comprises applying the first and second predetermined patterns such that the second dots are in line with the longitudinal axes of the first strips.

3. The method of manufacture according to claim 1, wherein the method comprises applying the first and second predetermined patterns such that the first dots are in line with the longitudinal axes of the second strips.

4. The method of manufacture according to claim 1, wherein the method comprises applying the first and second predetermined patterns such that the spacing between the first strip and the neighbouring second dot is a function of the spacing between the first strip and the neighbouring second strip.

5. The method of manufacture according to claim 4, wherein the spacing between the first strip and the neighbouring second dot is equal to the spacing between the first strip and the neighbouring second strip multiplied by a strain ratio of the blade.

6. The method of manufacture according to claim 1, wherein the size of the first or second dots is a function of one or more of: (a) the spacing between neighbouring strips adjacent to the first or second dot; (b) the width of the strip adjacent to the first or second dot; (c) the spacing between the longitudinal axes of the strips adjacent to the first or second dot; and (d) a strain ratio of the blade.

7. The method of manufacture according to claim 6, wherein the size of the first or second dot decreases with the distance of the first or second dot from the blade tip.

8. The method of manufacture according to claim 1, wherein the first and second strips are substantially obround.

9. The method of manufacture according to claim 1, wherein the first and second dots are substantially circular.

10. The method of manufacture according to claim 1, wherein the first and second predetermined patterns are arranged so as to allow a diffusion bond to be formed along the blade edges.

11. The method of manufacture according to claim 1, wherein the first layer forms a pressure surface or a suction surface of the turbomachine blade and the second layer forms the other of the pressure surface or suction surface.

12. The method of manufacture according to claim 1, wherein the blade is a compressor fan blade.

13. The method of manufacture according to claim 1, wherein the method further comprises heating and pressing the first and second layers and the membrane to diffusion bond the first and second layers and the membrane together to form an integral structure.

14. The method of manufacture according to claim 1, wherein the method further comprises placing the first and second layers and the membrane between appropriately shaped dies; heating the first and second layers, the membrane and dies; and supplying a pressurised fluid between the first and second layers to cause at least one of the first and second layers to be superplastically formed.

15. A blade for a turbomachine comprising a first layer, a second layer and a membrane therebetween, wherein
    the membrane is joined to the first layer across one or more first strips and one or more first dots, the first strips being arranged in a span-wise direction, and the first dots being located between the first strips and the blade tip edge, the first dots being offset from a longitudinal axis of the first strips in a chord-wise direction; and
    the membrane is joined to the second layer across one or more second strips and one or more second dots, the second strips being arranged in a span-wise direction and the second dots being located between the second strips and the blade tip edge, the second dots being offset from a longitudinal axis of the second strips in a chord-wise direction;
    wherein the second strips are spaced apart from the first strips and the first dots are spaced apart from the second dots on opposite sides of the membrane.

* * * * *